Oct. 20, 1959 J. E. THOMAS 2,908,971
PORTABLE HAY STACK CUTTING MACHINE
Filed Sept. 5, 1958 2 Sheets-Sheet 2

INVENTOR.
JOHN E. THOMAS
BY
McMorrow, Berman & Davidson
ATTORNEYS

United States Patent Office 2,908,971
Patented Oct. 20, 1959

2,908,971

PORTABLE HAY STACK CUTTING MACHINE

John E. Thomas, Malad City, Idaho

Application September 5, 1958, Serial No. 759,348

12 Claims. (Cl. 30—166)

This invention relates to a portable machine for cutting hay stacks either vertically or horizontally into blocks of hay, and more particularly to a power-operated machine of this kind which has a reciprocatory saw blade of sufficient length to cut about half-way through a hay stack, and a stationary handle facilitating holding the machine and manipulating the blade in a balanced manner.

The primary object of the invention is to provide an efficient, easily used, and rugged machine of the character indicated above which enables quickly and accurately cutting hay blocks from a hay stack, in order to obtain hay for stock feeding and other purposes, which eliminates the present laborious methods of tearing and digging hay from a stack in which the hay is tangled and impacted, the hay blocks so obtained thus being easily and conveniently carried to the places of use, and thereat more easily torn apart, if necessary.

A further object of the invention is to provide a simple well-balanced, and structurally and mechanically sound machine of the character indicated above, which involves positive and constant lubrication for its moving parts.

Other important objects and advantageous features of the invention will be apparent from the following description and the accompanying drawings, wherein, for purposes of illustration only, a specific form of the invention is set forth in detail.

In the drawings:

Figure 4 is a transverse vertical section taken on the line 4—4 of Figure 2; and Figure 5 is a transverse vertical section taken on the line 5—5 of Figure 2.

Referring in detail to the drawings, wherein like numerals designate like parts throughout the several views, the illustrated machine comprises a combined mechanism housing and lubricated crank case 10, a motor 12 mounted upon the case 10, a handle assembly 14 arranged around and above the motor, and a reciprocating saw blade assembly 16.

Figure 1:
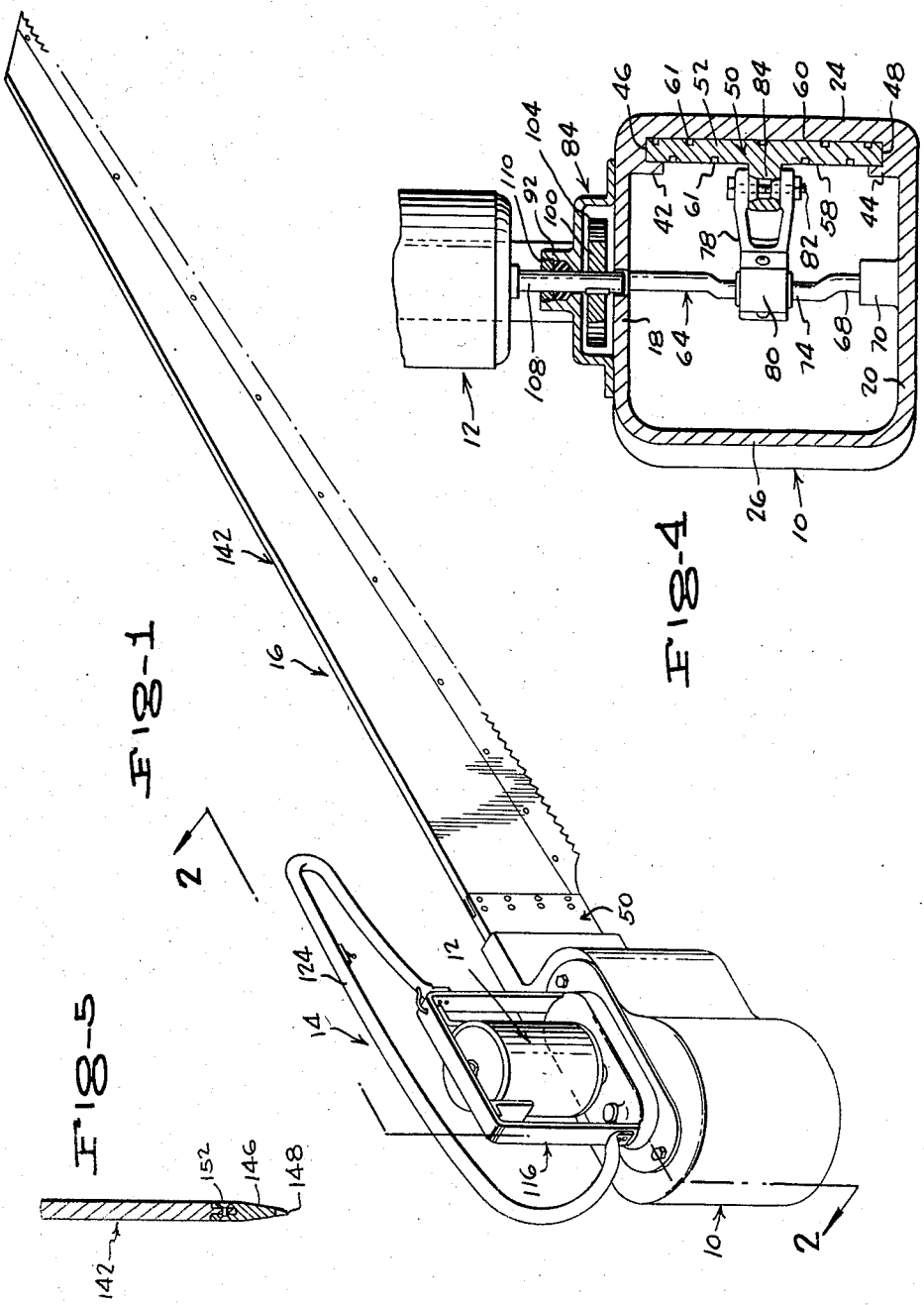
Figure 1 is a perspective view of a machine of the invention.

The case 10 is longitudinally elongated and comprises parallel spaced normally horizontal flat top and bottom walls 18 and 20, an arcuate rear end wall 22, a straight flat side walls 24, and an irregular side wall 26. A shown in Figures 1 and 3, the irregular side wall 26 has a laterally outwardly bowed rear end portion 28 of substantially the same curvature as the rear end wall 22 and continuous therewith so as to define a partially cylindrical crank shaft chamber 30. The arcuate portion 28 merges at its forward end in a laterally inwardly offset straight portion 32, parallel to the straight side wall 24, which terminates at its forward end in a laterally inwardly directed forward end wall 34 which terminates in a straight forward portion 36 which is closely spaced from and extends parallel along the forward part of the straight side wall 24.

In the region of the straight wall portion 36, the related parts of the straight side wall 24 and of the top and bottom wall 18 and 20, respectively, form a flat tubular vertical, longitudinally elongated guideway 38 which opens at its rear end into the interior of the case 10 at the straight side wall 24 and has an open forward end 40.

Formed on the facing surfaces of the top and bottom walls and on the inward side of the straight side wall 24 are facing upper and lower longitudinal and parallel channel slideways 42 and 44, respectively, as shown in Figure 4, in which are slidably confined the upper and lower edges 46 and 48, respectively, of a saw blade head 50. The head 50 is in the form of a flat rectangular plate 52 larger than the slideways 42 and 44 and having rear and forward ends 54 and 56, respectively, and laterally inward and outward sides 58 and 60, respectively. The sides of the blade head 50 are formed with vertically spaced longitudinal lubricating oil grooves 61, which open through the rear end 54 of the plate for holding lubricating oil and throwing lubricating oil to the drive mechanism 62 hereinafter described.

The drive mechanism 62 comprises a vertical crank shaft 64 having a lower end 68 journaled in a bearing 70 on the case bottom wall 20 at a location spaced rearwardly from the slideways 42 and 44 and positioned concentrically in the crank shaft chamber 30. The crank shaft 64 has an upper end portion 72, above its single throw 74, which rises through a relatively large access opening 76 provided in the case top wall 18. A connecting rod 78 is journaled, as indicated at 80 at its rear end on the throw 74 and is pivoted at its forward end, as indicated at 82, to a laterally inwardly projecting lug 84 on the inward side and at the rear end of the blade head 50.

Serving as a closure for the top wall access opening 76 and as a gear housing, is a longitudinally elongated pan-shaped cover 84 which has a peripheral lateral flange 86 bearing upon and secured to the upper surface of the case top wall 18, as by means of studs 88. At longitudinally spaced points thereof the cover 84 has a rear upstanding combined bearing and oil filler cup 90, and a forward upstanding sealed bearing cup 92 for a motor shaft, hereinafter described. The upper end portion 72 of the crank shaft 64 is smaller in diameter than the rear cup 90 and is journaled through the bottom thereof, as indicated at 94, in spaced relation to its side wall 96. The rear cup 90 is closed by a threaded filler plug 98 having a tubular shank 100 threaded into the side wall 96. Removal of the filler plug 98 enables replenishment of a body of lubricating oil (not shown) in the case 10, sufficient to maintain constant lubrication of and prevent wear of the components of the drive mechanism 62 and the saw blade head 50 and the slideways 42 and 44.

Fixed on the upper end portion 72 of the crank shaft, as indicated at 102, is a gear wheel 104 which is in mesh with a drive pinion 106 which is fixed on a vertical motor shaft 108 which is journaled through the forward bearing cup 92, which has therein oil seals 110 surrounding the motor shaft.

A motor 12, from which the shaft 108 depends, and which is illustrated permissively as being an electric motor, capable of being replaced by a gasoline or pneumatic motor, is mounted on and suspended, as by brackets 112 from the bight portion 114 of an inverted U-shaped frame 116 having depending rear and forward legs 118 and 120, respectively, which are suitably fixed at their lower ends to the cover 84 at related ends thereof, so that the motor 12 is removable from the case 10 with the cover 84.

The handle assembly 14, of which the motor frame 116 is a component, comprises a longitudinally elongated and vertically flatened loop 122, preferably of tubular material, and having a relatively straight main or hand grip portion 124 which terminates at its rear end in a downwardly and forwardly curved rear arm 126 having its lower end fixed, as indicated at 128, to the rear side at the lower end of the rear leg 126 of the motor frame 116. The main handle portion 124 terminates at its forward end 130, which is spaced at a substantial distance forwardly from the motor frame 116, in a return bent rearwardly declining arm 132 which is fixed at its lower end, as indicated at 134, to the forward side and at the upper end of the forward leg 120 of the motor frame 116. An electrical cable 136 in the energizing circuit (not shown) for the motor 12, leads therefrom through the forward handle arm 132 to a control switch 138 in the main handle portion 124, which has a depending switch operating element 140, which is easily reached by the operator of the machine holding the handle portion 124 for starting and stopping the machine.

The hande assembly 14 is an important constituent of the machine because of the relatively great length and weight of the saw blade assembly 16. The relatively long main handle portion 124 is located above and close to the motor 12 and extends forwardly therefrom, and is at a slight rearwardly declining angle to the saw blade assembly 16, in order that the forward part of the main handle portion 124 is at the center of gravity of the machine and so that the tendency of the machine to be over-balanced forwardly and downwardly by the saw blade assembly 16, can be overcome by supporting and manipulating the machine by gripping a forward part of the main portion 124 of the loop 122, in the region of the switch 138. In this connection the form and weight of the motor 12 is determined by its ability to substantially counterbalance the over-balancing weight of the saw blade assembly 16, and the handle assembly is offset relative to the saw blade assembly 16 toward and above the motor 12.

The saw blade assembly 16, of which the saw blade head 50 is a component, comprises a longitudinally elongated saw blade 142 of substantially uniform thickness, consistent with adequate strength, and of a length sufficient to cut about half-way through an ordinary hay stack. The blade 142 has a substantially straight upper edge 144 and a forwardly tapered or forwardly inclined toothed lower edge 146, whose teeth 148 are isometrical, so as to cut in both directions as the saw blade is reciprocated endwise. The toothed edge 146 is preferably of the replaceable type which is removably secured to the blade body 150, as indicated at 152.

Figure 2:
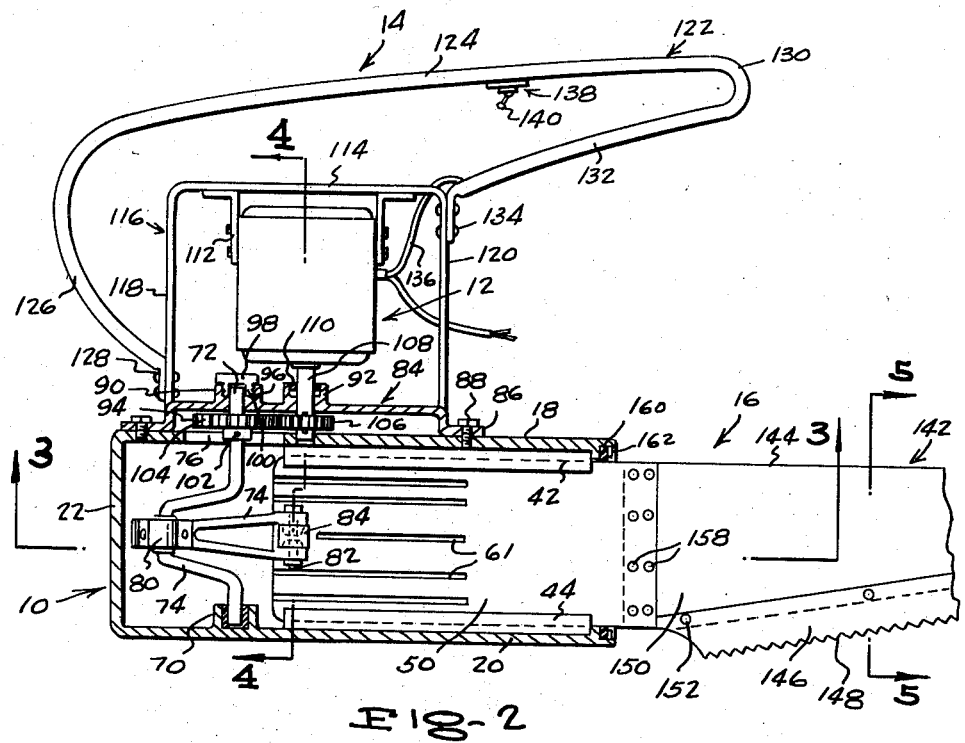
Figure 2 is an enlarged fragmentary vertical longitudinal section taken on the line 2—2 of Figure 1.
Figure 3:
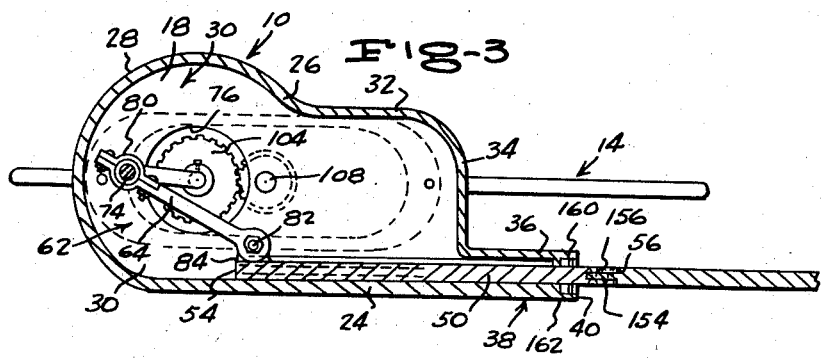
Figure 3 is a fragmentary horizontal section taken on the line 3—3 of Figure 2.

The saw blade 142 has, as shown in Figure 3, a reduced rear end portion 154 which is inset into a slot 156 in the forward end of the blade head 50, and secured therein, as indicated at 158. As shown in Figures 2 and 3, oil seals 160 are secured in seats 162 running along the top, bottom, and sides of the forward open end of the guideway 38, to prevent escape of lubricating oil from the case 10 at this point. As shown in Figure 2, the forward part of the saw blade head 50 does not pass rearwardly of the forward end of the guideway 38 in the rearmost position of the saw assembly 16.

In use, the saw blade 142 is worked downwardly from the top and/or from the sides of the hay stack, with the machine in operation, to make vertical and horizontal cuts in the hay stack, the cuts being made as to intersect each other at an angle, or in the same planes when made from opposite sides of a haystack, so as to form hay blocks which can then be easily transported to the places of use, as for feeding livestock.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A portable hay stack cutting machine comprising a closed lubricating oil-containing case having a crank shaft chamber at its rear end and a longitudinal guideway on its forward end, spaced longitudinal slideways in said guideway, a saw blade head slidably confined in said slideways for longitudinal reciprocating movements relative to the case, said blade head having a forward end reaching forwardly beyond said guideway, an elongated saw blade having a rear end fixed to the forward end of the blade head, drive mechanism within said crank shaft chamber, a motor mounted externally upon said case intermediate the ends thereof, said motor being weighted and positioned to counter the forwardly over-balancing weight of the saw blade, means operatively connecting said motor to said drive mechanism, and a machine balancing handle assembly secured upon the case in the region of the motor, said handle assembly having a longitudinally elongated hand grip portion close to and spaced above the motor and extending lengthwise the machine to a point forwardly beyond the motor.

2. A portable hay stack cutting machine according to claim 1, wherein said drive mechanism comprises a crank shaft journaled across the interior of the case in said crank shaft chamber and having a throw, a connecting rod journaled at one end on said throw and pivotally connected at its other end to said saw blade ahead at its rear end, said means comprising gear means.

3. A portable hay stack cutting machine according to claim 1, wherein said drive mechanism comprises a crank shaft journaled across the interior of the case in said crank shaft chamber and having a throw, a connecting rod journaled at one end on said throw and pivotally connected at its other end to said saw blade head at its rear end, said means comprising gear means, said case having top, bottom walls, rear and front end walls, and first and second side walls, said slideways being on said first side wall, and forward parts of said side walls and of the top and bottom walls defining said guideway, one end of said crank shaft being journaled on the bottom wall, said top wall being provided with an access opening registered with the crank shaft and through which the other end of the crank shaft rises, said gear means comprising a gear wheel fixed on said other end of the crank shaft, said motor having a drive shaft, and a pinion in mesh with said gear wheel and fixed on said motor drive shaft.

4. A portable hay stack cutting machine according to claim 1, wherein said drive mechanism comprises a crank shaft journaled across the interior of the case in said crank shaft chamber and having a throw, a connecting rod journaled at one end on said throw and pivotally connected at its other end to said saw blade head at its rear end, said means comprising gear means, said case having top, bottom walls, rear and front end walls, and first and second side walls, said slideways being on said first side wall, and forward parts of said side walls and of the top and bottom walls defining said guideway, one end of said crank shaft being journaled on the bottom wall, said top wall being provided with an access opening registered with the crank shaft and through which the other end of the crank shaft rises, said gear means comprising a gear wheel fixed on said other end of the crank shaft, said motor having a drive shaft and a pinion in mesh with said gear wheel and fixed on said motor drive shaft, a pan-shaped gear cover removably mounted upon said case top wall and covering said access opening and said gear wheel and said pinion, said handle assembly being supportably mounted on said removable cover.

5. A portable hay stack cutting machine according to claim 1, wherein said drive mechanism comprises a crank shaft journaled across the interior of the case in said crank shaft chamber and having a throw, a connecting rod journaled at one end on said throw and pivotally connected at its other end to said saw blade head at its rear end, said means comprising gear means, said case having top, bottom walls, rear and front end walls, and first and second side walls, said slideways being on said first side wall, and forward parts of said side walls and of the top and bottom walls defining said guideway, one end of said crank shaft being journaled on the bottom wall, said top wall being provided with an access opening registered with the crank shaft and through which the other end of the crank shaft rises, said gear means comprising a gear wheel fixed on said other end of the crank shaft, said motor having a drive shaft and a pinion in mesh with said gear wheel and fixed on said motor drive shaft, a pan-shaped gear cover removably mounted upon said case top wall and covering said access opening and said gear wheel and said pinion, said handle assembly being supportably mounted on said removable cover, said cover having a rear combined bearing and filler cup in which said other end of the crank shaft is journaled, and a removable filler plug engaged in said rear cup.

6. A portable hay stack cutting machine according to claim 1, wherein said drive mechanism comprises a crank shaft journaled across the interior of the case in said crank shaft chamber and having a throw, a connecting rod journaled at one end on said throw and pivotally connected at its other end to said saw blade head at its rear end, said means comprising gear means, said case having top, bottom walls, rear and front end walls, and first and second side walls, said slideways being on said first side wall, and forward parts of said side walls and of the top and bottom walls defining said guideway, one end of said crank shaft being journaled on the bottom wall, said top wall being provided with an access opening registered with the crank shaft and through which the other end of the crank shaft rises, said gear means comprising a gear wheel fixed on said other end of the crank shaft, said motor having a drive shaft and a pinion in mesh with said gear wheel and fixed on said motor drive shaft, a pan-shaped gear cover removably mounted upon said case top wall and covering said access opening and said gear wheel and said pinion, said handle assembly being supportably mounted on said removable cover, said cover having a rear combined bearing and filler cup in which said other end of the crank shaft is journaled, and a removable filler plug engaged in said rear cup, said cover having a forward sealed bearing cup through which the motor shaft is journaled.

7. A portable hay stack cutting machine according to claim 1, wherein said drive mechanism comprises a crank shaft journaled across the interior of the case in said crank shaft chamber and having a throw, a connecting rod journaled at one end on said throw and pivotally connected at its other end to said saw blade head at its rear end, said means comprising gear means, said case having top, bottom walls, rear and front end walls, and first and second side walls, said slideways being on said first side wall, and forward parts of said side walls and of the top and bottom walls defining said guideway, one end of said crank shaft being journaled on the bottom wall, said top wall being provided with an access opening registered with the crank shaft and through which the other end of the crank shaft rises, said gear means comprising a gear wheel fixed on said other end of the crank shaft, said motor having a drive shaft and a pinion in mesh with said gear wheel and fixed on said motor drive shaft, said saw blade head having laterally inward and laterally outward sides formed with longitudinal grooves opening through the rear end of the head for holding and throwing lubricating oil within the case.

8. A portable hay stack cutting machine comprising a closed lubricating oil-containing case having a crank shaft chamber at its rear end and a longitudinal guideway on its forward end, spaced longitudinal slideways in said guideway, a saw blade head slidably confined in said slideways for longitudinal reciprocating movements relative to the case said blade head having a forward end reaching forwardly beyond said guideway, an elongated saw blade having a rear end fixed to the forward end of the blade head, drive mechanism within said crank shaft chamber, a motor mounted externally upon said case intermediate the ends thereof, said motor being weighted and positioned to counter the forwardly over-balancing weight of the saw blade, means operatively connecting said motor to said drive mechanism, and a machine balancing handle assembly secured upon the case in the region of the motor, said handle assembly having a longitudinally elongated hand grip portion close to and spaced above the motor and extending lengthwise the machine to a point forwardly beyond the motor, said guideway having an open forward end through which said saw blade head extends, and oil seal means confined in said forward end of the guideway.

9. A portable hay stack cutting machine comprising a closed lubricating oil-containing case having a crank shaft chamber at its rear end an a longitudinal guideway on its forward end, spaced longitudinal slideways in said guideway, a saw blade head slidably confined in said slideways for longitudinal reciprocating movements relative to the case, said blade head having a forward end reaching forwardly beyond said guideway, an elongated saw blade having a rear end fixed to the forward end of the blade head, drive mechanism within said crank shaft chamber, a motor mounted externally upon said case intermediate the ends thereof, said motor being weighted and positioned to counter the forwardly over-balancing weight of the saw blade, means operatively connecting said motor to said drive mechanism, and a machine balancing handle assembly secured upon the case in the region of the motor, said handle assembly having a longitudinally elongated hand grip portion close to and spaced above the motor and extending lengthwise the machine to a point forwardly beyond the motor, said saw blade having a straight upper edge located in the horizontal plane of said case and a forwardly inclined lower cutting edge which is inclined forwardly relative to said plane.

10. A portable hay stack cutting machine comprising a closed lubricating oil-containing case having a crank shaft chamber at its rear end an a longitudinal guideway on its forward end, spaced longitudinal slideways in said guideway, a saw blade head slidably confined in said slideways for longitudinal reciprocating movements relative to the case, said blade head having a forward end reaching forwardly beyond said guideway, an elongated saw blade having a rear end fixed to the forward end of the blade head drive mechanism within said crank shaft chamber, a motor mounted externally upon said case intermediate the ends thereof, said motor being weighted and positioned to counter the forwardly over-balancing weight of the saw blade, means operatively connecting said motor to said drive mechanism, and a machine balancing handle assembly secured upon the case in the region of the motor, said handle assembly having a longitudinally elongated hand grip portion close to and spaced above the motor and extending lengthwise the machine to a point forwardly beyond the motor, said saw blade having a straight upper edge located in the horizontal plane of said case and a forwardly inclined lower cutting edge which is inclined forwardly relative to said plane, said cutting edge having isometric teeth thereon for cutting in both directions of reciprocation of the saw blade.

11. A portable hay stack cutting machine comprising a closed lubricating oil-containing case saving a crank shaft chamber at its rear end and a longitudinal guideway on its forward end, spaced longitudinal slideways in said guideway, a saw blade head slidably confined in said slideways for longitudinal reciprocating movements relative to the case, said blade head having a forward end reaching forwardly beyond said guideway, an elongated saw blade having a rear end fixed to the forward end of the blade head, drive mechanism within said crank shaft chamber, a motor mounted externally upon said case intermediate the ends thereof, said motor being weighted and positioned to counter the forwardly overbalancing weight of the saw blade, means operatively connecting said motor to said drive mechanism, and a machine balancing handle assembly secured upon the case in the region of the motor, said handle assembly having a longitudinally elongated hand grip portion close to and spaced above the motor and extending lengthwise the machine to a point forwardly beyond the motor, said handle assembly comprising a motor mounting frame on which the motor is mounted, and a longitudinally elongated flat loop extending lengthwise of the case, said loop being secured at opposite ends to rear and forward parts of said frame, said loop comprising a relatively long and substantially straight hand grip portion having a forward end located forwardly of said motor and said frame.

12. A portable hay stack cutting machine comprising a closed lubricating oil-containing case having a crank shaft chamber at its rear end and a longitudinal guideway on its forward end, spaced longitudinal slideways in said guideway, a saw blade head slidably confined in said slideways for longitudinal reciprocating movements relative to the case, said blade head having a forward end reaching forwardly beyond said guideway, an elongated saw blade having a rear end fixed to the forward end of the blade head, drive mechanism within said crank shaft chamber, a motor mounted externally upon said case intermediate the ends thereof, said motor being weighted and positioned to counter the forwardly overbalancing weight of the saw blade, means operatively connecting said motor to said drive mechanism, and a machine balancing handle assembly secured upon the case in the region of the motor, said handle assembly having a longitudinally elongated hand grip portion close to and spaced above the motor and extending lengthwise the machine to a point forwardly beyond the motor, said handle assembly comprising a motor mounting frame on which the motor is mounted, and a longitudinally elongated flat loop extending lengthwise of the case, said loop being secured at opposite ends to rear and forward parts of said frame, said loop comprising a relatively long and substantially straight hand grip portion having a forward end located forwardly of said motor and said frame, said hand grip portion being laterally offset from the saw blade and being near to and spaced above the motor and the motor mounting frame.

No references cited.